United States Patent Office 2,859,198
Patented Nov. 4, 1958

2,859,198

SURFACE-COATED SILICON-CONTAINING PARTICULATE MATERIAL AND RUBBERY COMPOSITION AND METHOD OF MAKING SAME

Daniel S. Sears, Henrico County, Va., and Edwin B. Newton, Akron, Ohio, assignors to The B. F. Goodrich Company, New York, N. Y., a corporation of New York No Drawing. Application June 12, 1951
Serial No. 231,254

21 Claims. (Cl. 260—37)

This invention relates to surface-coated particulate material and pertains more particularly to surface-coated silicon-containing particulate material and rubbery compositions including same and method of making same.

It is an object of this invention to provide a finely-divided material which is suitable as a rubber reinforcing pigment in reinforcing light-colored and white rubbery compositions.

Another object of this invention is to provide a light-colored or blue-white finely-divided surface-coated silicon-containing reinforcing pigment for rubbery compositions which does not discolor light-colored or white rubbery compositions to which it is added.

Still another object of this invention is to provide a finely-divided surface-coated silicon-containing reinforcing pigment for rubbery compositions which imparts to a rubbery composition to which it is added improved abrasion resistance properties as compared with conventional uncoated silicon-bearing rubber reinforcing pigments.

It is still another object of this invention to provide a method of making a light-colored or white rubbery composition having high abrasion resistance.

Other objects of this invention will be apparent from the description which follows.

Reinforcing pigments have been added to rubbery compositions for many years to increase the hardness, stiffness, resistance to cutting, tearing and abrasion, and strength of the vulcanized compositions. Carbon blacks are generally employed as the reinforcing pigment in rubbery compositions mainly because the carbon black reinforcing pigments have been the most satisfactory known reinforcing pigments readily available. With an increasing demand for light-colored and white rubbery articles, it has become apparent that carbon black reinforcing pigments are not completely satisfactory, since they are unable to satisfy the color requirement of reinforcing pigments for light-colored and white rubbery compositions.

Finely-divided silicon-containing materials have been proposed as substitutes for carbon black reinforcing pigments for rubbery compositions and the vulcanized rubbery compositions have been satisfactory for many purposes; however the conventional silicon-containing reinforcing pigments do not impart to rubbery compositions a sufficiently high resistance to abrasion to render them satisfactory as reinforcing pigments for rubbery compositions which are required to exhibit high abrasion resistance properties.

The present invention attains the aforementioned objectives providing a finely-divided or particulate material which imparts excellent properties to rubbery compositions to which it is added. A reinforcing pigment made in accordance with this invention may be almost pure white permitting it to be incorporated into white or light-colored rubbery compositions. Rubbery compositions within the purview of this invention comprise a finely-divided inorganic solid silicon-containing material, preferably a water-insoluble silicon-containing particulate material, having an organo-siloxane material coated over its outer face.

Among the solid inorganic silicon-containing particulate materials which may be coated with an organo-siloxane material in accordance with this invention are silica, silicon monoxide (or an intimate mixture of silicon and silica), polymeric silicon oxyimide (the preparation of which is described in my copending application filed May 26, 1950, Serial No. 164,619, now U. S. Patent 2,666,754), calcium silicate, magnesium silicate, leucite, analcite, nephelite, kaliophylite, hypersthene, diopside, acmite, jadeite, tremolite, melilite, sarcolite, garnet, pyrope, melonite, fayalite, muscovite, and the like. It is desirable that the silicon-containing particulate material be relatively stable in the presence of hydrogen chloride and consist of a particulate material which has an average particle size of from 5 to 200 millimicrons, preferably an average particle size of from 20 to 40 millimicrons. Silica, silicon monoxide and polymeric silicon oxyimide have proven particularly satisfactory as the finely-divided silicon-containing material for utilization in this invention.

Although any organo-siloxane material may be used as the surface coating for the silicon-containing particulate material with an accompanying improvement in the rubber reinforcing properties of the particulate material, it is desirable that the organo-siloxane material contain at least one mono valent unit which has at least one olefinic carbon to carbon double bond ($>C=C<$) therein and preferably comprises a resilient organo-siloxane resin.

A more preferred group of organo-siloxane materials for use in this invention is the group of polymeric organo-siloxane condensation products obtained by the hydrolysis of organic halosilanes. Among the organic halosilanes which may be reacted with water to form polymeric organo-siloxanes are:

Methyl chlorosilane
Dimethyl chlorosilane
Trimethyl chlorosilane
Methyl dichlorosilane
Methyl trichlorosilane
Dimethyl dichlorosilane
Ethyl chlorosilane
Ethyl dichlorosilane
Ethyl trichlorosilane
Diethyl chlorosilane
Diethyl dichlorosilane
Triethyl chlorosilane
Vinyl chlorosilane
Vinyl dichlorosilane
Vinyl trichlorosilane
Divinyl chlorosilane
Divinyl dichlorosilane
Propyl chlorosilane
Propyl dichlorosilane
Propenyl trichlorosilane
Isopropenyl chlorosilane
3-butenyl chlorosilane
2-butenyl dichlorosilane
3-butenyl trichlorosilane
Di-3-butenyl dichlorosilane
4-pentenyl trichlorosilane
Dodecylenyl trichlorosilane
3-butenyl bromosilane
3-butenyl tribromosilane
4-pentenyl tribromosilane
Phenyl chlorosilane
Diphenyl dichlorosilane
$\Delta^2$-tetrahydrobenzyl trichlorosilane
$\Delta^3$-tetrahydrobenzyl trichlorosilane
Methyl bromosilane Methyl dibromosilane
Methyl tribromosilane
Dimethyl dibromosilane
Ethyl dibromosilane
Ethyl tribromosilane
Vinyl tribromosilane
Propenyl bromosilane
Phenyl bromosilane
Triphenyl bromosilane
Phenyl tribromosilane
$\Delta^2$-tetrahydrobenzyl tribromosilane
$\Delta^3$-tetrahydrobenzyl tribromosilane, and the like.

Even more preferred for use in this invention are polymeric organosiloxane condensation products obtained by the hydrolysis of organic halosilanes containing at least one monovalent radical having at least one olefinic carbon to carbon double bond ($>C=C<$) therein, such as:

Vinyl chlorosilane
Vinyl dichlorosilane
Vinyl trichlorosilane
Vinyl bromosilane
Vinyl dibromosilane
Vinyl tribromosilane
Divinyl chlorosilane
Divinyl dichlorosilane
Propenyl chlorosilane
Propenyl dichlorosilane
Propenyl trichlorosilane
Propenyl tribromosilane
3-butenyl chlorosilane
2-butenyl dichlorosilane
3-butenyl trichlorosilane
Di-3-butenyl dichlorosilane
4-pentenyl trichlorosilane
2-pentenyl trichlorosilane
1-butenyl tribromosilane
3-pentenyl tribromosilane
$\Delta^2$-tetrahydrobenzyl trichlorosilane
$\Delta^2$-tetrahydrobenzyl tribromosilane
$\Delta^3$-tetrahydrobenzyl tribromosilane
$\Delta^3$-tetrahydrobenzyl trichlorosilane, and the like.

The preparation of organo-siloxanes is well known in the art, being described in various literature references including the General Electric Company United States Patents No. 2,386,259, No. 2,390,378 and No. 2,398,672.

The organo-siloxane material may be applied to the surface of the silicon-containing particulate material in any manner conventionally utilized in coating surfaces of finely divided or particulate materials having an average particle size of from 5 to 200 millimicrons, such as by spraying the organo-siloxane onto the surfaces of the particulate material, the organo-siloxane material being dissolved in an appropriate volatile organic solvent if necessary, or by introducing a finely divided vapor or mist of the organo-siloxane into an air-dispersion of the particulate material. The coated particulate material is then dried, preferably by subjecting it to a hot air stream having a temperature of from 75° to 150° C., although the material may be dried by merely exposing it to air at room temperature. In the case of the organo-halosilanes, the hydrogen halide produced by hydrolysis is driven off during the drying step with the formation of a siloxane resin. It is desirable that the coating applied to the surface of the silicon-containing particulate material be of uniform thickness and that the weight of the coating applied to each particle of the particulate material be from 0.3 to 20% by weight of the uncoated particle; preferably the weight of the coating is from 5 to 13% by weight of the uncoated particle and preferably the coated silicon-containing particulate material has an average particle size of from 5 to 200 millimicrons, an average particle size of from 10 to 40 millimicrons being even more preferred.

Finely divided or particulate products within the purview of this invention are excellent reinforcing pigments for rubbery compositions imparting to the rubbery compositions physical properties and characteristics generally equivalent to those obtained when reinforcing the rubbery compositions with carbon black. Among the rubbery materials capable of reinforcement are natural rubber, such as caoutchouc and the like which is essentially a conjugated polymer of isoprene, or synthetic rubber, such as the rubbery polymers of open-chain conjugated dienes having from 4 to 8 carbon atoms exemplified by butadiene-1,3; 2,3-dimethyl butadiene-1,3; 1,4-dimethyl butadiene-1,3 and the like, or the rubbery copolymers of these and similar conjugated diolefins with each other or with copolymerizable monomeric materials containing a single ethylenic linkage, such as acrylonitrile, styrene, methyl acrylate, methyl methacrylate, ethyl acrylate, ethyl methacrylate, isobutylene, or similar materials or the rubbery polymers of other conjugated dienes, such as chloroprene and the like.

To impart optimum reinforcement to the rubbery compositions, it is preferable to incorporate from 30 to 80 parts by weight of our surface-coated silicon-containing reinforcing pigment into the rubbery composition based on 100 parts by weight of rubbery material in the composition, although smaller quantities of our pigment impart some reinforcement to the rubbery composition, of course. Appropriate compounding ingredients, such as fillers, accelerators, vulcanizing agents, antioxidants, etc., may also be employed in the rubbery compositions.

To clearly illustrate this invention the following examples are given, but it will be understood that the examples are intended merely as illustrations of the invention and are not intended to limit the scope of the invention.

*Example 1*

Relatively pure finely divided silicon monoxide having an average particle diameter from 5 to 200 millimicrons was placed in an agitator and 5 percent by weight of propenyl trichlorosilane based on the weight of the silicon monoxide was introduced into the agitator in the form of a vapor or mist by passing a hot inert gas such as nitrogen through the liquid silane maintained at a temperature about 50° C. below the boiling point of the silane, the silicon monoxide being continuously agitated during this operation. Water in an amount in excess of that required for complete hydrolysis of the silane was likewise introduced into the agitator in the form of a vapor or mist suspended in air at the same time and agitation of the silicon monoxide, silane and water was continued, the water vapor reacting with the silane to form an organo-siloxane condensation product over the surface of the silicon monoxide particles. The organo-siloxane coated silicon monoxide was dried by passing air through the coated particulate material which also removed any hydrogen chloride generated during the hydrolysis reaction. The water required for hydrolysis of the halosilane is preferably introduced into the reactor before the halosilane or simultaneously therewith. It may also be added subsequently to the halosilane, or the particulate material, after being coated with halosilane, may simply be allowed to stand in the open at room temperature for about 24 hours, whereupon the moisture normally present in the atmosphere will bring about hydrolysis. However, there tends to be some loss of halosilane from the surface of the material before hydrolysis when either of the latter two methods is employed.

The amount of water employed is not critical so long as there is at least enough to hydrolyze the halosilane employed.

The following recipe is a typical example of a rubbery composition embodying this invention using natural rubber:

Material: Parts by weight
- Natural rubber _____ 100.0
- Organo-siloxane coated silicon monoxide described in Example 1 _____ 65.0
- Zinc oxide _____ 5.0
- Pine tar _____ 1.0
- Stearic acid _____ 1.5
- 2-mercapto benzothiazole _____ 1.0
- Phenyl betanaphthylamine _____ 1.0
- Sulfur _____ 3.0
- Didodecylamine _____ 1.5

Total _____ 179.0

The rubber and compounding ingredients were mixed in the usual manner on a roll mill and the resulting rubbery composition was vulcanized in a mold at 280° F. for varying lengths of time. The tensile strength, at 300% elongation and at rupture, of the test sample and the elongation value at the time of rupture of the vulcanized rubbery composition are indicated by the following data:

| Vulcanization Time at 280° F. | 300% Modulus, p. s. i. | Tensile Strength at Breaking Point, p. s. i. | Percent Elongation at the Break |
|---|---|---|---|
| 10 minutes | 1,070 | 2,970 | 580 |
| 20 minutes | 1,490 | 3,400 | 550 |
| 40 minutes | 1,600 | 3,530 | 540 |
| 60 minutes | 1,550 | 3,530 | 550 |
| 90 minutes | 1,430 | 2,950 | 520 |

*Example 2*

Finely-divided silicon monoxide was coated as described in Example 1 except that 10% by weight of propenyl trichlorosilane based on the weight of the silicon monoxide was introduced into the agitator instead of 5%.

Another typical example of a rubbery composition embodying this invention is as follows:

Material: Parts by weight
- Natural rubber _____ 100.0
- Organo-siloxane coated silicon monoxide described in Example 2 _____ 65.0
- Zinc oxide _____ 5.0
- Pine tar _____ 1.0
- Stearic acid _____ 1.5
- 2-mercapto benzothiazole _____ 1.0
- Phenyl betanaphthylamine _____ 1.0
- Sulfur _____ 3.0
- Didodecylamine _____ 1.5

Total _____ 179.0

The rubbery composition was compounded in the usual manner on a roll mill and the composition was vulcanized in a mold at 280° F. for varying lengths of time, the following data being obtained upon testing the vulcanized samples:

| Vulcanization Time at 280° F. | 300% Modulus, p. s. i. | Tensile Strength at Breaking Point, p. s. i. | Percent Elongation at the Break |
|---|---|---|---|
| 10 minutes | 1,550 | 4,200 | 600 |
| 20 minutes | 1,960 | 4,230 | 525 |
| 40 minutes | 2,320 | 4,100 | 460 |
| 60 minutes | 2,320 | 3,600 | 415 |
| 90 minutes | 2,310 | 3,840 | 480 |

*Example 3*

Finely-divided silicon monoxide was coated as described in Example 1 except that 10% by weight of diphenyl dichlorosilane based on the weight of the silicon monoxide was introduced into the agitator in place of the 5% by weight of propenyl trichlorosilane based on the weight of the silicon monoxide.

A typical recipe of a rubbery composition embodying the organo-siloxane coated silicon monoxide of this example is as follows:

Material: Parts by weight
- Natural rubber _____ 100.0
- Organo-siloxane coated silicon monoxide described in Example 3 _____ 65.0
- Zinc oxide _____ 5.0
- Pine tar _____ 1.0
- Stearic acid _____ 1.5
- 2-mercapto benzothiazole _____ 1.0
- Phenyl betanaphthylamine _____ 1.0
- Sulfur _____ 3.0
- Didodecylamine _____ 1.5

Total _____ 179.0

The ingredients of this recipe were compounded on a roll mill in the usual manner and vulcanized in a mold at 280° F. for varying lengths of time. The vulcanized composition exhibited the following properties:

| Vulcanization Time at 280° F. | 300% Modulus, p. s. i. | Tensile Strength at Breaking Point, p. s. i. | Percent Elongation at the Break |
|---|---|---|---|
| 10 minutes | 1,340 | 3,660 | 575 |
| 20 minutes | 1,190 | 3,170 | 550 |
| 40 minutes | 1,120 | 2,740 | 505 |
| 60 minutes | 1,170 | 3,170 | 550 |
| 90 minutes | 950 | 1,970 | 460 |

*Example 4*

Finely-divided silicon monoxide was coated as described in Example 1 except that 10% by weight of ethyl trichlorosilane based on the weight of the silicon monoxide was introduced into the agitator in place of the 5% by weight of propenyl trichlorosilane based on the weight of the silicon monoxide.

A typical example of a rubbery composition incorporating this organo-siloxane coated silicon monoxide is as follows:

Material: Parts by weight
- Natural rubber _____ 100.0
- Organo-siloxane coated silicon monoxide described in Example 4 _____ 65.0
- Zinc oxide _____ 5.0
- Pine tar _____ 1.0
- Stearic acid _____ 1.5
- 2-mercapto benzothiazole _____ 1.0
- Phenyl betanaphthylamine _____ 1.0
- Sulfur _____ 3.0
- Didodecylamine _____ 1.5

Total _____ 179.0

The ingredients of the recipe were compounded together on a roll mill in the usual manner and the composition was vulcanized at 280° F. for varying lengths of time. The following data were obtained when vulcanized samples of the composition were tested:

| Vulcanization Time at 280° F. | 300% Modulus, p. s. i. | Tensile Strength at Breaking Point, p. s. i. | Percent Elongation at the Break |
|---|---|---|---|
| 10 minutes | 1,170 | 3,590 | 580 |
| 20 minutes | 1,430 | 3,300 | 525 |
| 40 minutes | 1,310 | 3,320 | 525 |
| 60 minutes | 1,120 | 3,180 | 520 |
| 90 minutes | 1,010 | 3,070 | 590 |

Example 5

Finely-divided silica having an average particle diameter from 5 to 200 millimicrons was coated as described in Example 1 except that 20% by weight of propenyl trichlorosilane based on the weight of silica was introduced into the agitator instead of 5% by weight of propenyl trichlorosilane.

The following recipe is a typical example of a rubbery composition incorporating this reinforcing pigment:

| Material: | Parts by weight |
| --- | --- |
| Natural rubber | 100.0 |
| Organo-siloxane coated silica described in Example 5 | 60.0 |
| Zinc oxide | 5.0 |
| Pine tar | 1.0 |
| Stearic acid | 1.5 |
| 2-mercapto benzothiazole | 1.0 |
| Phenyl betanaphthylamine | 1.0 |
| Sulfur | 3.0 |
| Didodecylamine | 1.5 |
| Total | 174.0 |

The rubbery composition was prepared on a roll mill in the usual manner and vulcanized at 280° F. for varying lengths of time. Vulcanized samples of the rubbery composition exhibited the following properties:

| Vulcanization Time at 280° F. | 300% Modulus, p. s. i. | Tensile Strength at Breaking Point, p. s. i. | Percent Elongation at the Break |
| --- | --- | --- | --- |
| 10 minutes | 810 | 3,510 | 700 |
| 20 minutes | 1,030 | 4,670 | 685 |
| 40 minutes | 1,070 | 4,680 | 680 |
| 60 minutes | 1,060 | 4,160 | 605 |
| 90 minutes | 950 | 4,210 | 625 |

Example 6

Finely-divided polymeric silicon oxyimide having an average diameter from 5 to 200 millimicrons was coated as described in Example 1 except that 10% by weight of propenyl trichlorosilane based on the weight of polymeric silicon oxyimide was introduced into the agitator instead of 5% by weight of propenyl trichlorosilane.

A typical example of a rubbery composition utilizing this organo-siloxane coated polymeric silicon oxyimide is as follows:

| Material: | Parts by weight |
| --- | --- |
| Natural rubber | 100.0 |
| Organo-siloxane coated polymeric silicon oxyimide described in Example 6 | 65.0 |
| Zinc oxide | 5.0 |
| Pine tar | 1.0 |
| Stearic acid | 1.5 |
| 2-mercapto benzothiazole | 1.0 |
| Phenyl betanaphthylamine | 1.0 |
| Sulfur | 3.0 |
| Didodecylamine | 1.5 |
| Total | 179.0 |

The materials were mixed together on a roll mill in the usual manner and vulcanized at 280° F. for varying lengths of time. The following data were obtained when vulcanized samples of the rubbery composition were tested:

| Vulcanization Time at 280° F. | 300% Modulus, p. s. i. | Tensile Strength at Breaking Point, p. s. i. | Percent Elongation at the Break |
| --- | --- | --- | --- |
| 10 minutes | 810 | 3,910 | 675 |
| 20 minutes | 1,110 | 4,700 | 675 |
| 40 minutes | 1,430 | 4,410 | 675 |
| 60 minutes | 1,450 | 4,320 | 615 |
| 90 minutes | 1,590 | 4,230 | 590 |

Example 7

Finely-divided silica having an average diameter from 5 to 200 millimicrons was coated with an organo-siloxane by placing relatively pure silica in an agitator and introducing 10% by weight of butyl dichlorosilane based on the weight of silica into the agitator in the form of a finely-divided vapor while the silica was being continuously agitated. Water in an amount in excess of that required for the complete hydrolysis of the silane was simultaneously introduced into the agitator in the form of a finely-divided vapor while continuously agitating the silane-coated silica. The hydrolized particulate product was then dried by exposing it to a hot air stream.

A typical example of a rubbery composition embodying this invention is as follows:

| Material: | Parts by weight |
| --- | --- |
| Natural rubber | 100.0 |
| Organo-siloxane coated silica described in Example 7 | 75.0 |
| Zinc oxide | 5.0 |
| Pine tar | 1.0 |
| Stearic acid | 1.5 |
| 2-mercapto benzothiazole | 1.0 |
| Phenyl betanaphthylamine | 1.0 |
| Sulfur | 3.0 |
| Didodecylamine | 1.5 |
| Total | 189.0 |

The ingredients were compounded together on a roll mill in the usual manner and vulcanized at 275° F. for 40 minutes. A vulcanized product exhibiting excellent physical properties was obtained.

Example 8

A typical example of a rubbery composition embodying this invention using synthetic rubber as the elastomeric material is as follows:

| Material: | Parts by weight |
| --- | --- |
| Rubbery butadiene-styrene copolymer (75:25) (GR–S) 72% conversion | 100.0 |
| Organo-siloxane coated silicon monoxide described in Example 2 | 40.0 |
| Zinc oxide | 5.0 |
| Palm oil | 1.0 |
| Stearic acid | 1.5 |
| Tetramethyl thiuram disulfide | 4.5 |
| Total | 152.0 |

The composition was prepared by mixing the ingredients on a roll mill in the usual manner and vulcanizing the composition at 285° F. for 30 minutes. A vulcanized product having excellent physical properties, as indicated by tensile strength and elongation measurements, was obtained.

Example 9

A typical example of a rubbery composition embodying this invention using neoprene rubber as the elastomeric material is as follows:

| Material: | Parts by weight |
|---|---|
| Rubbery chloroprene - isoprene copolymer (GR–M) | 100.0 |
| Organo-siloxane coated silica described in Example 5 | 30.0 |
| Zinc oxide | 15.0 |
| Magnesium oxide | 4.5 |
| Pine tar | 2.0 |
| Stearic acid | 5.0 |
| Total | 156.5 |

The ingredients were compounded on a roll mill in the usual manner and vulcanized in a mold at 290° F. for 40 minutes. The vulcanized rubbery composition exhibited excellent physical properties, as indicated by tensile strength and elongation measurements.

Vulcanized rubbery compositions within the purview of this invention exhibit abrasion resistance properties equivalent to those exhibited by rubbery compositions reinforced with carbon black and much superior to those exhibited by rubbery compositions reinforced with uncoated silicon-containing particulate reinforcing pigments as illustrated by the following data:

| Sample | Williams Abrasion Range [1] (cc. of rubber lost/H.P. hour) |
|---|---|
| Natural rubber composition reinforced with optimum quantity of organo-siloxane coated pigment described in Example 2 | 150–200 |
| Natural rubber composition reinforced with optimum quantity of organo-siloxane coated pigment described in Example 3 | 180–230 |
| Natural rubber composition reinforced with optimum quantity of organo-siloxane coated pigment described in Example 4 | 180–230 |
| Natural rubber composition reinforced with optimum quantity of easy processing channel black | 150–200 |
| Natural rubber composition reinforced with optimum quantity of uncoated silicon-containing particulate reinforcing pigment | 300–450 |

[1] Abrasion values were obtained by testing the vulcanized samples as described in "A. S. T. M. Standards on Rubber Products" under specification D394-47, Method A.

Finely-divided coated silicon-containing pigments within the purview of this invention may be incorporated into light-colored to white rubbery compositions without irreparably discoloring the composition.

It is clear that obvious variations and modifications may be made without departing from the spirit and scope of this invention as defined in the appended claims.

We claim:

1. An elastomeric composition comprising a rubbery conjugated diene polymer and a finely-divided inorganic solid silicon-containing material coated with an organo-siloxane, the weight of the coating being from 0.3 to 20% by weight of the uncoated material.

2. An elastomeric composition comprising a rubbery conjugated diene polymer and a finely-divided water-insoluble inorganic solid silicon-containing material coated with an organo-siloxane, said material having an average particle diameter of 5 to 200 millimicrons and the weight of the coating being from 0.3 to 20% by weight of the uncoated material.

3. An elastomeric composition comprising a rubbery conjugated diene polymer and a finely-divided inorganic solid silicon-containing material coated with a hydrolysis product of an organic halosilane containing at least one monovalent radical having an ethylenic carbon to carbon double bond, the weight of the coating being from 0.3 to 20% by weight of the uncoated material.

4. An elastomeric composition comprising 100 parts by weight of a rubbery conjugated diene polymer and from 30 to 80 parts by weight of a finely-divided inorganic solid silicon-containing material coated with an organo-siloxane, the weight of the coating being from 5 to 13% by weight of the uncoated material.

5. An elastomeric composition comprising 100 parts by weight of a rubbery conjugated diene polymer and from 30 to 80 parts by weight of a finely-divided inorganic solid silicon-containing material coated with an organo-siloxane, said material having an average particle diameter of from 5 to 200 millimicrons and the weight of the coating being from 5 to 13% by weight of the uncoated material.

6. An elastomeric composition comprising 100 parts by weight of a rubbery conjugated diene polymer and from 30 to 80 parts by weight of a finely-divided inorganic solid silicon-containing material coated with a condensation product of water with an organic halosilane containing at least one monovalent radical having an ethylenic carbon to carbon double bond, the weight of the coating being from 5 to 13% by weight of the uncoated material.

7. An elastomeric composition comprising 100 parts by weight of a rubbery conjugated diene polymer and from 30 to 80 parts by weight of finely-divided silica coated with an organo-siloxane, the weight of the coating being from 5 to 13% by weight of the uncoated silica.

8. An elastomeric composition comprising 100 parts by weight of a rubbery conjugated diene polymer and from 30 to 80 parts by weight of finely-divided solid silicon monoxide coated with an organo-siloxane, the weight of the coating being from 5 to 13% by weight of the uncoated silicon monoxide.

9. An elastomeric composition comprising 100 parts by weight of a rubbery conjugated diene polymer and from 30 to 80 parts by weight of finely-divided polymeric silicon oxyimide coated with an organo-siloxane, the weight of the coating being from 5 to 13% by weight of the uncoated polymeric silicon oxyimide.

10. A composition of matter comprising finely-divided solid silicon monoxide coated with an organo-siloxane, said composition of matter having an average particle diameter of from 5 to 200 millimicrons and the weight of the coating being from 0.3 to 20% by weight of the uncoated silicon monoxide.

11. A composition of matter comprising finely-divided polymeric silicon oxyimide coated with an organo-siloxane, said composition of matter having an average particle diameter of from 5 to 200 millimicrons and the weight of the coating being from 0.3 to 20% by weight of the uncoated polymeric silicon oxyimide.

12. The method of making a vulvanized rubbery composition comprising uniformly dispersing a finely-divided inorganic solid silicon-containing material coated with an organo-siloxane into a rubbery conjugated diene polymer and vulcanizing the composition, the weight of the coating being from 0.3 to 20% by weight of the uncoated material.

13. The method of making a vulcanized rubbery composition comprising uniformly dispersing a finely-divided water-insoluble inorganic solid silicon-containing material coated with a condensation product of water with an organic halosilane containing at least one monovalent radical having an ethylenic carbon to carbon double bond into a rubbery conjugated diene polymer and vulcanizing the composition, the weight of the coating being from 0.3 to 20% by weight of the uncoated material.

14. An elastomeric composition comprising a rubbery conjugated diene polymer and finely-divided solid silicon monoxide coated with an organo-siloxane, the weight of the coating being from 0.3 to 20% by weight of the uncoated silicon monoxide.

15. An elastomeric composition comprising a rubbery conjugated diene polymer and finely-divided solid silicon monoxide coated with an organo-siloxane, said coated silicon monoxide having an average particle diameter of 5 to 200 millimicrons and the weight of the coating being from 0.3 to 20% by weight of the uncoated silicon monoxide.

16. An elastomeric composition comprising a rubbery conjugated diene polymer and finely-divided solid silicon monoxide coated with an organo-siloxane containing at least one monovalent radical having an ethylenic carbon-to-carbon double bond, the weight of the coating being from 0.3 to 20% by weight of the uncoated silicon monoxide.

17. An elastomeric composition comprising 100 parts by weight of a rubbery conjugated diene polymer and from 30 to 80 parts by weight of finely-divided solid silicon monoxide coated with an organo-siloxane, said coated silicon monoxide having an average particle diameter of 5 to 200 millimicrons and the weight of the coating being from 5 to 13% by weight of the uncoated silicon monoxide.

18. The method of making a vulcanized rubbery composition comprising uniformly dispersing finely-divided inorganic solid silicon monoxide coated with an organo-siloxane into a rubbery conjugated diene polymer and vulcanizing the composition, the weight of the coating being from 0.3 to 20% by weight of the uncoated silicon monoxide.

19. A composition of matter comprising finely-divided silicon-containing material selected from the group consisting of silicon monoxide and polymeric silicon oxyimide and coated with an organo-siloxane, said composition of matter having an average particle diameter of from 5 to 200 millimicrons and the weight of the coating being from 0.3 to 20% by weight of the uncoated material.

20. An elastomeric composition comprising a rubbery conjugated diene polymer and a finely-divided silica coated with a saturated aliphatic organo-siloxane.

21. An elastomeric composition comprising a rubbery conjugated diene polymer and the reaction product of a finely-divided silica and an unsaturated acyclic halosilane in the presence of water.

References Cited in the file of this patent

UNITED STATES PATENTS

| | | |
|---|---|---|
| 2,424,853 | Safford | July 29, 1947 |
| 2,439,689 | Hyde | Apr. 13, 1948 |
| 2,510,661 | Safford | June 6, 1950 |
| 2,528,606 | Pedersen | Nov. 7, 1950 |
| 2,563,555 | Safford | Aug. 7, 1951 |
| 2,578,605 | Sears et al. | Dec. 11, 1951 |
| 2,610,167 | Te Grotenhuis | Sept. 9, 1952 |
| 2,665,264 | Brooks et al. | Jan. 5, 1954 |